United States Patent [19]

Komai et al.

[11] Patent Number: 4,917,844
[45] Date of Patent: Apr. 17, 1990

[54] METHOD OF MANUFACTURING LAMINATE PRODUCT

[75] Inventors: Toshiya Komai; Sei Kawahara; Mitsuhiro Ikeda, all of Shizuoka, Japan

[73] Assignee: Fuji Photo Film Co., Ltd., Kanagawa, Japan

[21] Appl. No.: 176,053

[22] Filed: Mar. 31, 1988

[30] Foreign Application Priority Data

Apr. 1, 1987 [JP] Japan .................................. 62-77552

[51] Int. Cl.$^4$ ............................................. B29C 47/88
[52] U.S. Cl. ...................................... 264/85; 156/243; 156/244.27; 264/556; 264/171; 264/216; 264/237; 425/72.1; 425/75
[58] Field of Search ................. 264/85, 171, 237, 348, 264/212, 216, 556; 425/72.1, 73–75, 66, 325, 378.1; 156/244.27, 243

[56] References Cited

U.S. PATENT DOCUMENTS

| | | | |
|---|---|---|---|
| 3,077,428 | 2/1963 | Heuser et al. ........................... | 264/85 |
| 3,154,608 | 10/1964 | Aronsen ................................ | 264/212 |
| 3,161,560 | 12/1964 | Paquin et al. ......................... | 264/212 |
| 3,347,962 | 10/1967 | Dieck et al. .......................... | 264/212 |
| 3,421,964 | 1/1969 | Arbit .................................... | 425/325 |
| 3,470,055 | 9/1969 | Wade .............................. | 156/244.27 |
| 3,578,527 | 5/1971 | Sakata et al. ................... | 156/244.27 |
| 4,370,187 | 1/1983 | Katagiri et al. ................ | 156/244.27 |

FOREIGN PATENT DOCUMENTS

| 2051700 | 4/1971 | Fed. Rep. of Germany | ........ 425/75 |
|---|---|---|---|
| 60-36123 | 2/1985 | Japan .................................. | 264/556 |

Primary Examiner—Jeffery Thurlow
Attorney, Agent, or Firm—Sughrue, Mion, Zinn, Macpeak & Seas

[57] ABSTRACT

When a laminate product is manufactured by extruding a thermoplastic resin on a substrate for coating, a space enclosed between a member for cooling the thermoplastic resin and a non-cooled thermoplastic resin film is kept within an atmosphere having a high permeability with respect to the thermoplastic resin film. Occurrence of craters in the laminated resin film is reduced.

10 Claims, 2 Drawing Sheets

METHOD OF MANUFACTURING LAMINATE PRODUCT

BACKGROUND

The present invention relates to a method of coating a support with a thermoplastic resin film.

A method of coating a substrate with a resin by heat-melting a thermoplastic resin (referred to as "resin", simply hereinafter) such as polyolefin to extrude the melted resin in a film state on a substrate such as paper through an extruder, and by pressing the extruded resin on the substrate by means a nip roll or the like is called extrusion coating (also referred to as "extrusion laminating"), which has been widely adapted in manufacturing photographic resin-coated paper or wrapping paper (for instance, Japanese Patent Kokai-Publication No. 50-155222).

However, with increasing utility of the extrusion coated products (laminate products), diversified requirements for the product quality have arisen. As a result, there occur cases where ordinary extrusion coating devices cannot satisfy these various requirements. In particular, in the case of resin coated paper used as a support (or substrate) for photographic printing paper, there has arisen a problem in that the conventional extrusion coating device cannot cope with the above-mentioned problem since high quality is required.

In the paper as the support for photographic printing paper which is extrusion coated by the prior-art extrusion coating device, there exists a problem in that a great number of craters are produced. The so-called craters are formed as concave recesses on the coated film resin side due to air entrained by the cooling rolls and enclosed between the resin film and the cooling roll.

When the number of craters increases outer appearance of the products is damaged and therefore the quality is degraded, and further, the value of products is damaged in the case of the paper as the support for photographic printing paper because the surface luster is lowered.

Further, with an increasing production speed, the number of craters increases. Therefore, in the case of the paper as the support for photographic printing paper, it has been difficult to increase the production speed and therefore the productivity.

SUMMARY OF THE DISCLOSURE

It is an object of the present invention to provide a method of manufacturing laminate products which can solve the problems involved in the prior art.

According to the present invention, the above-mentioned object can be achieved by a method of manufacturing a laminate product characterized in that when a laminate product is manufactured by extruding a thermoplastic resin on a substrate for coating, a space enclosed between a member for cooling the thermoplastic resin and a non-cooled thermoplastic resin film is kept within an atmosphere having a high permeability with respect to the thermoplastic resin film.

As shown in FIG. 4 according to the method of the present invention, the number of craters produced in laminate product manufacturing is significantly reduced as compared with the conventional method.

Therefore, it is possible to manufacture laminate products without degrading the outer appearance and the quality thereof. Further, in the case of the laminate products of paper as a support for photographic printing paper, since the surface luster is not lowered, the value of products is not damaged.

Further, as shown in FIG. 4, even when the production speed is increased, the number of craters will not be increased markedly as contrasted to the conventional method.

Therefore, upon producing the laminate products it is possible to easily increase the production speed and productivity.

PREFERRED EMBODIMENTS

For manufacturing laminate products, a thermoplastic resin film extruded from an extrusion die is brought into intimate contact with a substrate before being cooled, for instance, with a cooling roll. At this moment, since it is necessary to removed air from a space enclosed between the cooling member for the thermoplastic resin film and the non-cooled thermoplastic resin film, a gas with a high permeability to the thermoplastic resin film is supplied (e.g., blown) to replace air therewith. To smoothly replace the air, it is also preferable to provide a member for removing air accompanied by the cooling member.

For blowing a gas of high permeability to the thermoplastic resin film, it is preferable to provide a nozzle to blow a gas of a high thermoplastic resin film permeability toward the space enclosed by the cooling member and the resin film just before laminating and cooling. The cooling member for the thermoplastic resin is preferably a roll or the like. The cooling roll may serve as a laminating device, too. The air accompanied by the cooling member may be further blocked mechanically, e.g., by means of a blade or the like.

The substrate in the present invention may be paper, resin or metal according to the laminate products required.

The thermoplastic resin may be polyolefinic resin such as polyethylene, polypropylene, etc., or other known thermoplastic resin.

The gas of high thermoplastic resin film permeability is selected according to the thermoplastic resin, and preferably a gas with a permeability 10 to 100 times higher than that of air. In practice, the gas is $O_2$, $H_2O$ (gas, e.g., dry or unsaturated steam) or $CO_2$ when the thermoplastic resin film is the polyolefinic resin.

It is sufficient that the gas permeable through the thermoplastic resin film fills at least the space enclosed between the thermoplastic resin cooling member and the thermoplastic resin film. The gas can be supplied beyond this space or the entire manufacturing process can be installed within an atmosphere filled with the gas.

The present invention will be explained in detail with reference to the attached drawings.

BRIEF DESCRIPTION OF THE DRAWINGS

FIG. 3 is a side view showing a prior-art extrusion coating device, in which resin 2 is extruded in a film state onto a substrate 3 continuously fed in the arrow direction with an extrusion die 1 and brought into pressure contact with the substrate at a nip point between the nip roll 5 and a cooling roll 6. The nip roll 5 is backed up by a backup roll 4 to exert pressure on the nip roll 5 toward the cooling roll 6.

FIG. 1 is a side view showing an embodiment of the present invention, in which a nozzle 8 for blowing a gas 9 is disposed in a space enclosed by a polyolefin film 2 formed by a conventional extrusion coating device and the cooling roll 6. The resultant cooled laminate 10 is removed from the cooling roll 6 by means of a removing roll 7 after a travel around the cooling roll 6 over a length of a half to two thirds of the circumference thereof, and then will be wound up by a takeup roll (not shown).

The kinds of the blown gas can be selected from those with a high permeability to the polyolefin film. In particular, carbon dioxide is effective. The amount of gas to be blown is not specified in particular, but it is sufficient when the air entrained by the cooling roll can be replaced with the blown gas.

Figure 2:
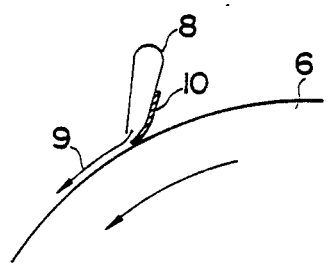
FIG. 2 is an enlarged view showing a case where a blade is attached beneath the nozzle.

Further, when air accompanied by the cooling roll 6 is removed positively by attaching a blade 10 made of urethane rubber beneath the nozzle 8 as shown in FIG. 2, since the air can be easily replaced with the gas, it is possible to reduce the amount of the blown gas. The material of the blade 10 is not specifically limited.

EXAMPLE 1

Figure 1:
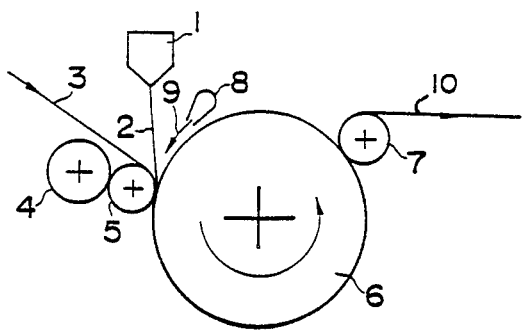
FIG. 1 is a side view showing an embodiment of the present invention.

By use of a device shown in FIGS. 1 and 2, laminate products were manufactured by coating a 30 μm thick polyethylene on the surface of a thick paper having a 175 μm thickness and a 300 mm width. The coating speed was 150 to 200 m/min. Since the permeability of air against the polyethylene film is 2.0 to $3.3 \times 10^{-10}$ [$cc/cm^2 \cdot mm \cdot sec \cdot cmHg$], carbon dioxide was used as a gas to be blown through the nozzle, the blowing rate of the blown gas was 36 l/min per unit width of 300 mm.

Comparative Example

Figure 3:
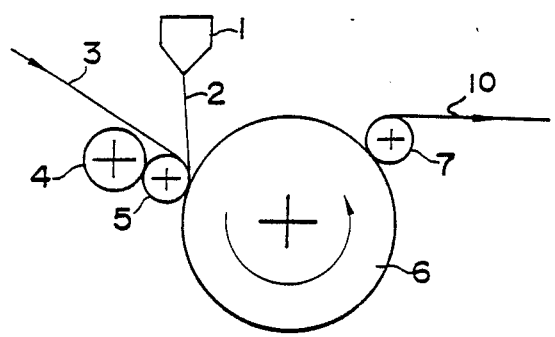
FIG. 3 is a side view showing a conventional extrusion coating device.

Using a device shown in FIG. 3, coating was effected by the conventional method without blowing carbon dioxide gas otherwise under the same conditions as in Example 1.

The number of craters per one square centimeter was measured for comparison.

Figure 4:
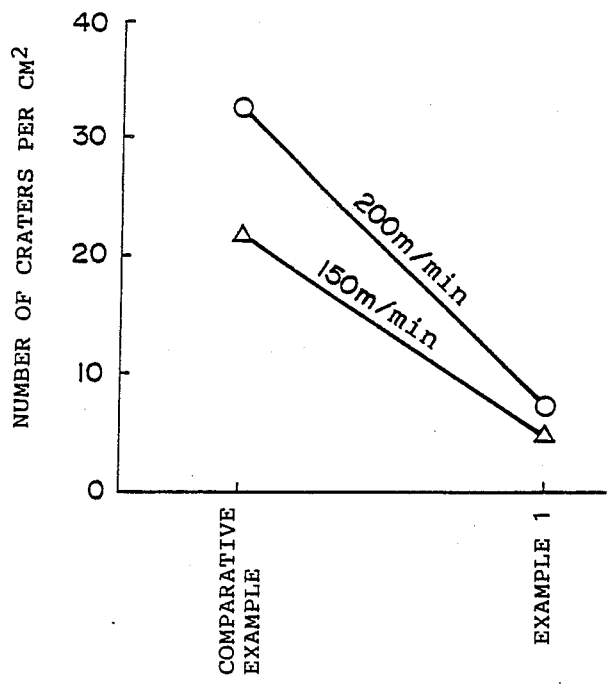
FIG. 4 is a graph showing a comparison with respect to the number of craters between the example according to the present invention and the comparative example by the conventional method.

FIG. 4 shows the test results.

FIG. 4 indicates that when a gas (carbon dioxide in this test) of high permeability to polyolefin film is blown according to the present invention, the number of craters can be reduced even at a high speed production, as compared with that in the conventional method.

It should be understood that modifications may be done without departing from the gist and scope of the invention as claimed.

We claim:

1. A method of manufacturing laminate products wherein when a laminate product is manufactured by extruding a thermoplastic resin on a substrate for coating, a space enclosed between a member for cooling the thermoplastic resin and a non-cooled thermoplastic resin film is kept within an atmosphere containing a gas having a high permeability with respect to the thermoplastic resin film.

2. The method as defined in claim 1, wherein said atmosphere is of a gas having an at least 10 times greater permeability than that of air.

3. The method as defined in claim 1, wherein said atmosphere is produced by supplying said space with a gas having a higher permeability than that of air.

4. The method as defined in claim 3, wherein said atmosphere gas is blown through a nozzle into said space.

5. The method as defined in claim 3, wherein air entrained by the cooling member is mechanically removed.

6. The method as defined in claim 5, wherein the air removal is effected by blocking out air by means of blade means from the surface of the cooling member.

7. The method as defined in claim 2, wherein said gas is one selected from the group consisting of oxygen, carbon dioxide and steam in a case where the thermoplastic resin is a polyolefinic resin.

8. The method as defined in claim 7, wherein said gas is carbon dioxide.

9. The method as defined in claim 1, wherein said cooling member is a cooling roll, and said space is defined by the cooling roll surface and the thermoplastic resin film contacting at a nip point between the cooling roll and a nip roll.

10. The method as defined in claim 1, wherein said substrate is a paper for photographic printing paper and laminated with the thermoplastic resin film by means of said cooling roll and a nip roll by passing through these rolls.

* * * * *